Figure 1:
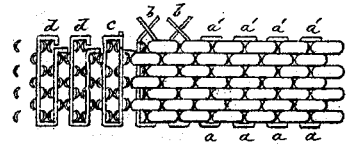

(86.)

JOSEPH J. FREEMAN.

Improvement in Manufacturing Flat Ornamental Chains.

No. 122,824.                                 Patented Jan. 16, 1872.

UNITED STATES PATENT OFFICE.

JOSEPH J. FREEMAN, OF ATTLEBOROUGH, MASSACHUSETTS, ASSIGNOR TO FREEMAN & CO., OF SAME PLACE.

IMPROVEMENT IN MANUFACTURING FLAT ORNAMENTAL CHAINS.

Specification forming part of Letters Patent No. 122,824, dated January 16, 1872.

I, JOSEPH J. FREEMAN, of Attleborough, in the county of Bristol and State of Massachusetts, have invented certain Improvements in the Manufacture of Chain for Jewelry, of which the following is a specification:

The nature of my invention consists in an improved mode of turning the ends of the staples used to hold the beads in a chain formed of two or more rows of links arranged to break joints with each other.

The drawing, Fig. 1, shows a plain and a sectional view of a chain formed of seven rows of links, arranged to break joints with each other, being held together by means of the staples $a\ a\ a\ a$, which are bent over at $a'\ a'\ a'\ a'$ in such a manner as to present the same appearance upon both edges of the chain. The ends of the staples are at first as shown at $b\ b$. One of them is to be turned over and the end of the other cut off, as shown at $c$. The short end is then to be turned down on the next lower row of beads, as shown at $d\ d$, which makes a very secure fastening without lapping the ends of the staples as heretofore, and at the same time entirely avoids the expense and trouble of soldering. When the chain is made with an even number of rows of links, the short ends of the staples will be turned upon the lower row, and toward the long ends, instead of the long toward the short ones, as shown in the figure.

I claim—

As an improvement in the art of making wire chains consisting of series of rows of beads held together by transverse staples, the bending of one limb of the staple down upon and around the outer link, and shortening the other limb and bending it down upon the link in the next adjoining longitudinal row of beads, thus producing a chain without soldering, in which the transverse staples present the same appearance on both of the edges.

JOSEPH J. FREEMAN.

Witnesses:
DEXTER B. POTTER,
SOCRATES SCHOLFIELD. (86)